(12) United States Patent
Specht et al.

(10) Patent No.: US 11,091,188 B2
(45) Date of Patent: Aug. 17, 2021

(54) STEERING COLUMN THAT IS ADJUSTABLE BY MOTOR FOR A MOTOR VEHICLE AND AD-JUSTMENT DRIVE FOR A STEERING COLUMN

(71) Applicants: ThyssenKrupp Presta AG, Eschen (LI); thyssenkrupp AG, Essen (DE)

(72) Inventors: Jean-Pierre Specht, Sennwald (CH); Sebastian Huber, Göfis (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 254 days.

(21) Appl. No.: 16/068,734

(22) PCT Filed: Jan. 22, 2018

(86) PCT No.: PCT/EP2018/051428
§ 371 (c)(1),
(2) Date: Jul. 9, 2018

(87) PCT Pub. No.: WO2018/138044
PCT Pub. Date: Aug. 2, 2018

(65) Prior Publication Data
US 2021/0206419 A1   Jul. 8, 2021

(30) Foreign Application Priority Data
Jan. 30, 2017 (DE) .......................... 102017201379.6

(51) Int. Cl.
*B62D 1/181* (2006.01)
*F16H 25/20* (2006.01)
(Continued)

(52) U.S. Cl.
CPC ............ *B62D 1/181* (2013.01); *F16C 19/183* (2013.01); *F16C 33/588* (2013.01); *F16H 25/20* (2013.01);
(Continued)

(58) Field of Classification Search
CPC ...... B62D 1/181; F16C 19/183; F16C 33/588; F16C 33/581; F16C 2326/24;
(Continued)

(56) References Cited

U.S. PATENT DOCUMENTS 4,967,618 A    11/1990 Matsumoto
5,690,362 A    11/1997 Peitsmeier
(Continued)

FOREIGN PATENT DOCUMENTS

CN    104417609 A        3/2015
DE       3725645 A1 *    2/1989   ............ F16C 23/086
(Continued)

OTHER PUBLICATIONS

English Translation of International Search Report issued in PCT/EP2018/051428, dated May 28, 2018 (dated Jun. 5, 2018). [English translation unavailable.].

*Primary Examiner* — Daniel D Yabut
(74) *Attorney, Agent, or Firm* — thyssenkrupp North America, LLC

(57) ABSTRACT

A steering column adjustable by motor for a motor vehicle, including a carrying unit, which is attachable to a vehicle body, and which holds an actuating unit, in which a steering spindle is rotatably mounted, and including an adjustment drive, which is connected to the carrying unit and to the actuating unit, and by means of which the actuating unit is adjustable relative to the carrying unit, wherein the adjustment drive includes a threaded spindle with an axis, said threaded spindle engaging in a spindle nut, a drive unit and
(Continued)

a gear wheel that is driveable to rotate about the axis by the drive unit.

11 Claims, 4 Drawing Sheets

(51) Int. Cl.
    *F16C 19/18*         (2006.01)
    *F16C 33/58*         (2006.01)

(52) U.S. Cl.
    CPC .... *F16C 2326/24* (2013.01); *F16H 2025/209* (2013.01); *F16H 2025/2084* (2013.01)

(58) Field of Classification Search
    CPC ...... F16C 2361/61; F16H 25/20; F16H 25/24; F16H 2025/209; F16H 2025/2084; Y10T 74/19902
    See application file for complete search history.

(56) References Cited

U.S. PATENT DOCUMENTS

| | | |
|---|---|---|
| 9,421,994 B2 | 8/2016 | Agbor |
| 2009/0266187 A1* | 10/2009 | Okada ..................... F16H 25/24 74/89.23 |
| 2013/0160597 A1 | 6/2013 | Masuda |
| 2014/0013877 A1* | 1/2014 | Cataldo ............... F16H 57/0445 74/89.3 |
| 2015/0060188 A1 | 3/2015 | Kitamura |
| 2015/0232117 A1 | 8/2015 | Stinebring |
| 2019/0315391 A1 | 10/2019 | Illés |

FOREIGN PATENT DOCUMENTS

| | | | |
|---|---|---|---|
| DE | 38 86 900 T2 | 5/1989 | |
| DE | 195 24 196 C | 11/1996 | |
| DE | 102014104362 A | 10/2015 | |
| DE | 102014214331 A1 * | 1/2016 | ............ F16C 33/581 |

* cited by examiner

STEERING COLUMN THAT IS ADJUSTABLE BY MOTOR FOR A MOTOR VEHICLE AND AD-JUSTMENT DRIVE FOR A STEERING COLUMN

CROSS REFERENCE TO RELATED APPLICATIONS

This application is a U.S. National Stage Entry of International Patent Application Serial No. PCT/EP2018/051428, filed Jan. 22, 2018, which claims priority to German Patent Application No. DE 10 2017 201 379.6, filed Jan. 30, 2017, the entire contents of both of which are incorporated herein by reference.

FIELD

The present disclosure generally relates a steering column and an adjustment drive for a steering column that is adjustable by motor for a motor vehicle.

BACKGROUND

Steering columns for motor vehicles have a steering shaft with a steering spindle, at the rear end of which in the direction of travel, which faces the driver, a steering wheel is attached for introducing a steering command by the driver. The steering spindle is mounted in a manner rotatable about its longitudinal axis in an actuating unit, which is held at the vehicle body by a carrying unit. There can be a longitudinal adjustment on account of the fact that the actuating unit is received in a casing unit, connected to the carrying unit, which is also referred to as guide box or box-section swinging fork, in a telescopically displaceable manner in the direction of the longitudinal axis. A height adjustment can be realized by virtue of the actuating unit or a casing unit receiving the latter being pivotably mounted at the carrying unit. Adjusting the actuating unit in the longitudinal or height direction allows an ergonomically comfortable steering wheel position to be set relative to the driver position in an operating position, also referred to as a drive or operating position, in which there can be a manual steering intervention.

For the purposes of adjusting the actuating unit relative to the carrying unit, the prior art has disclosed the provision of a motor-driven adjustment drive with drive unit that comprises an electrical servomotor which is connected to a spindle drive—as a rule, via a transmission—that comprises a threaded spindle screwed into a spindle nut. By way of the drive unit, the threaded spindle and the spindle nut are driveable to rotate against one another about an axis, namely the threaded spindle axis, as a result of which the threaded spindle and the spindle nut can be moved in translational fashion to one another or away from one another, depending on the direction of rotation. In a first embodiment, the threaded spindle is driveable to rotate about its threaded spindle axis by the drive unit which is fixedly connected to the actuating unit or the carrying unit and engages in the spindle nut which is fixedly attached in relation to a rotation about the threaded spindle axis at the carrying unit or, alternatively, at the actuating unit. In the direction of the threaded spindle axis, the threaded spindle is supported at the carrying unit or at the actuating unit and the spindle nut is accordingly supported at the actuating unit or, alternatively, at the carrying unit such that a rotational drive of the threaded spindle brings about a translational adjustment of carrying unit and actuating unit relative to one another in the direction of the threaded spindle axis. Therefore, this embodiment is also referred to as a rotational spindle drive.

In a second, alternative embodiment, the threaded spindle is coupled to the carrying unit or, alternatively, to the actuating unit in a non-rotational manner with respect to rotation about its threaded spindle axis and the spindle nut is rotationally mounted accordingly at the actuating unit or, alternatively, at the carrying unit but it is stationary in the direction of the threaded spindle axis. Like in the first embodiment, the threaded spindle is supported at the carrying unit or at the actuating unit in the direction of the threaded spindle axis and the spindle nut is accordingly supported at the actuating unit or at the carrying unit such that the threaded spindle is displaceable in a translational manner in the direction of the threaded spindle axis by virtue of the spindle nut being driven to rotate by the drive unit. This embodiment is also referred to as a plunger spindle drive.

Like in the first alternative, a translational adjustment of carrying unit and actuating unit relative to one another is brought about in the direction of the threaded spindle axis as a result of the rotational drive of the threaded spindle. In both embodiments, the spindle drive forms a motor-driven adjustment drive that is effective between carrying unit and actuating unit, said adjustment drive facilitating the adjustment of the actuating unit relative to the carrying unit for adjustment purposes.

In order to realize a longitudinal adjustment of the actuating unit in the direction of the longitudinal axis of the steering spindle, a spindle drive of an adjustment drive can be arranged between the adjusting unit and a casing unit that receives the latter in an axially longitudinally displaceable manner, said casing unit also being referred to as a guide box or box-section swinging fork and being connected to the carrying unit, and wherein the threaded spindle axis can be aligned substantially parallel to the longitudinal axis. For the purposes of height adjustment, a spindle drive can be arranged between the carrying unit and an actuating unit that is mounted thereon so as to be pivotable in height or a casing unit, in which the actuating unit is received. A motor-driven longitudinal and height adjustment can be embodied at a steering column individually or in combination.

The drive of the spindle drive is effected by the drive unit by way of a gear wheel that is driveable to rotate about its axis, which is identical to the threaded spindle axis, said gear wheel being connected to the spindle nut or to the threaded spindle for rotation therewith, depending on the embodiment of the spindle drive. The gear wheel has a toothing portion in the form of a spur gear, with an outer circumferential toothing or worm toothing. The toothing portion is arranged in the axis direction between two end side circumferential bearing faces that are coaxial to the axis. In a bearing arrangement, the bearing faces are arranged between corresponding outer bearing faces, which are embodied in a stationary manner at the actuating unit or the carrying unit, for example in a bearing housing. As a result, holding and adjustment forces that act on the gear wheel in both axial directions of the threaded spindle axis on the spindle drive are transmitted via the bearing faces onto the outer bearing faces at the actuating unit or the carrying unit and the gear wheel is axially supported.

Such an adjustment drive with a rotatably mounted and axially supported gear wheel is known from U.S. Pat. No. 4,967,618, for example. The gear wheel comprises axial bearing faces that are arranged axially on both sides of a toothing portion, said bearing faces comprising raceways for rolling bodies, specifically ball-bearing raceways of ball bearings. Ball bearings as rolling bodies are arranged between these ball-bearing raceways and corresponding ball-bearing raceways in the axially or obliquely opposing stationary outer bearing faces. As a result, a bearing arrangement is formed, in which the gear wheel is mounted between two pressure bearings in a manner supported in the axial direction, said pressure bearings in each case being formed by a bearing face, an outer bearing face and the ball bearings arranged therebetween.

According to U.S. Pat. No. 4,967,618, the ball-bearing raceways can be moulded directly into the gear wheel, which has an integral embodiment with the toothing and with the spindle nut, i.e., comprises the female thread of the spindle nut that is continuous in the axis direction. An advantage of this embodiment is that a single component can, in itself, unify the essential functions of the bearing and drive element. However, a disadvantage is that the toothing, the thread of the spindle nut and the ball-bearing raceways require different mechanical properties, which are partly in conflict with one another and which cannot be satisfied by an integral component made of a single material. By way of example, plastics materials are particularly well-suited to the toothing and the thread, but unsuitable for ball-bearing raceways, which are preferably manufactured from a hard roller bearing steel. Although the aforementioned prior art also proposes to axially clamp the gear wheel between two separate pressure bearings, permanently high axial forces are exerted on the gear wheel, which would lead to a plastic deformation of a gear wheel manufactured from plastics, as a result of the play-free axial bracing, which is required for low-wear and low-noise running, and as a result of the loads occurring during operation. The play arising as a result thereof is unacceptable. Moreover, the separate pressure bearings lead to a high manufacturing and assembly outlay.

Thus a need exists for a steering column with an improved adjustment drive with an optimized gear wheel, which has improved mechanical properties, and an improved adjustment drive for a steering column for a motor vehicle.

DETAILED DESCRIPTION

Figure 1:
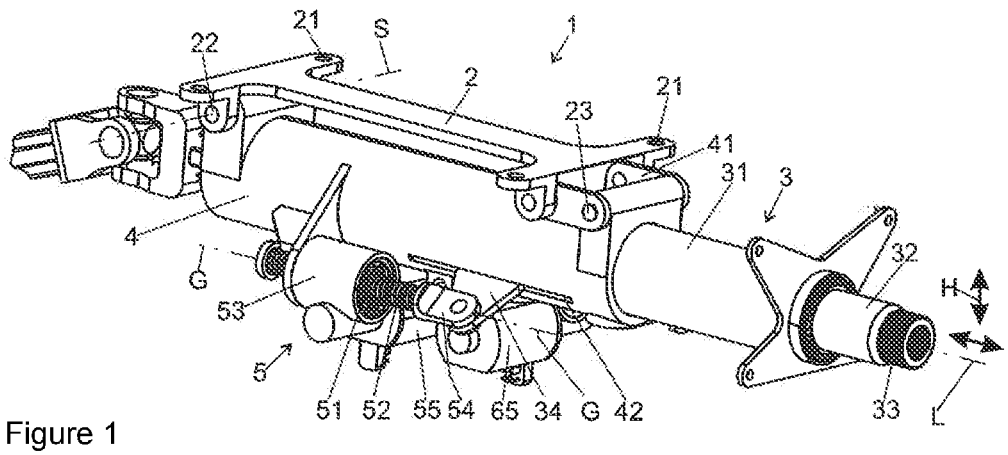
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column that is adjustable by motor for a motor vehicle, including a carrying unit, which is attachable to a vehicle body, and which holds an actuating unit, in which a steering spindle is rotatably mounted about a longitudinal axis, and including an adjustment drive, which is connected to the carrying unit and to the actuating unit, and by means of which the actuating unit is adjustable relative to the carrying unit, wherein the adjustment drive includes a threaded spindle with an axis. The threaded spindle engages in a spindle nut, a drive unit and a gear wheel that is driveable to rotate about the axis by the drive unit. The gear wheel includes a toothing portion that is arranged axially between two circumferential bearing faces coaxial to the axis, wherein the gear wheel is connected to the spindle nut or the threaded spindle for rotation therewith, and wherein the threaded spindle and the spindle nut are driveable to rotate relative to one another about the axis by the drive unit.

Furthermore, the invention relates to an adjustment drive for a steering column that is adjustable by motor for a motor vehicle. The adjustment drive includes a threaded spindle with an axis. The threaded spindle engages in a spindle nut, a drive unit and a gear wheel which is driveable to rotate about the axis by the drive unit and which has a toothing portion, which is arranged axially between two circumferential bearing faces that are coaxial to the axis, wherein the gear wheel is connected to the spindle nut or the threaded spindle for rotation therewith.

In some examples, a steering column includes a carrying unit, which is attachable to a vehicle body, and which holds an actuating unit, in which a steering spindle is rotatably mounted about a longitudinal axis, and includes an adjustment drive, which is connected to the carrying unit and to the actuating unit, and by means of which the actuating unit is adjustable relative to the carrying unit. The adjustment drive includes a threaded spindle with an axis. The threaded spindle engages in a spindle nut, a drive unit and a gear wheel that is driveable to rotate about the axis by the drive unit. The gear wheel includes a toothing portion that is embodied axially between two circumferential bearing faces coaxial to the axis, wherein the gear wheel is connected to the spindle nut or the threaded spindle for rotation therewith, and wherein the threaded spindle and the spindle nut are driveable to rotate relative to one another about the axis by the drive unit. According to the invention, the gear wheel has a core element, to which two bearing rings are connected, said bearing rings each having a bearing face and being axially supported against one another.

Preferably, the core element lies outside of the power flow between the bearing rings. As a result, a force acting on the bearing rings in the direction of the axis is not introduced into the core element. The bearing rings that support one another form a support device which supports pressure forces acting axially on the bearing rings outside of the core element and consequently keeps these away from the core element.

Furthermore, an adjustment drive for a steering column that is adjustable by motor for a motor vehicle is proposed for achieving the object, said adjustment drive comprising a threaded spindle with an axis, said threaded spindle engaging in a spindle nut, a drive unit and a gear wheel which is driveable to rotate about the axis by the drive unit and which has a toothing portion, which is arranged axially between two circumferential bearing faces that are coaxial with the axis, wherein the gear wheel is connected to the spindle nut or the threaded spindle for rotation therewith. According to the invention, what is proposed for a generic adjustment drive with the aforementioned features is that the gear wheel has a core element, two bearing rings being connected therewith, said bearing rings each having a bearing face and supporting one another axially.

Preferably, the core element lies outside of the power flow between the bearing rings. As a result, a force acting axially on the bearing rings in the direction of the axis is not introduced into the core element. The bearing rings that support one another form a support device which supports pressure forces acting axially on the bearing rings outside of the core element and consequently keeps these away from the core element.

In the gear wheel according to the invention, the bearing rings are connected to a core element at the end side, and so an easy-to-assemble integral component is provided. Axially, the bearing rings are applied on both sides of the toothing portion and each have a bearing face on their outer sides, which face away from the core element and which also form outer sides of the gear wheel. Here, according to the invention, the bearing rings are connected to one another in such a way that a force that is introduced onto the bearing faces in the axial direction is transferred from the one bearing ring to the other bearing ring without the core element being loaded by the force between the bearing rings. Expressed differently, the core element is kept with little load between the bearing rings in the axis direction when an axial force is introduced, for example when applying an axial clamping force for setting the bearings without play. Here, the axial power flow between the bearing rings can be established by virtue of the two bearing rings contacting one another and directly supporting one another in the axial direction, or it can be established indirectly, wherein a force transmission element may be arranged between the two bearing rings, said force transmission element likewise not transmitting any force onto the core element in the axial direction. In any case, the force transmission in the axial direction is effected, without interposing the core element, via the stiff structure for force transmission or conduction that is formed by the bearing rings, independently of the core element.

The bearing faces are arranged between outer bearing faces of a bearing arrangement. In each case, one outer bearing face, which is usually arranged at an outer ring, lies axially opposite a bearing face in this case such that the bearing gap is situated between the outer bearing face and bearing face. As a result of the outer bearing faces being adjusted relative to one another in the axial direction, it is possible to set the distance to the bearing faces, and hence the bearing play, and it is possible to apply an axial force in order to brace the bearing faces between the outer bearing faces without play.

The axial forces acting on the bearing rings are transferred in an axial power flow past the core element by way of the mutual support according to the invention. A load exerted axially onto the bearing faces is absorbed by the structure according to the invention between the bearing rings and thereby kept away from the core element. As a result of no material of the core element being situated in the axial power flow, it is not loaded by the forces occurring when the bearing is braced and by the forces occurring during operation.

As a result, the possibility of independently optimizing the materials of the bearing rings and of the core element in view of the properties required during operation arises. Preferably, the bearing rings can consist of a hard material that does not yield to pressure, which facilitates a rigid and loadable axial connection, said connection being suitable for receiving the forces acting on the bearing face, and preferably facilitates an integrated embodiment of plain bearing faces or rolling body raceways. By way of example, steel fulfils these requirements well. By contrast, the core material can consist of a softer material, for example of softer metal alloys, such as brass, for example, or plastics. Plastics, in particular, can be optimized in view of their properties to the respective requirements, for example in respect of elasticity and sliding properties for realizing drives and spindle drives with little play and smooth running. The property of such plastics materials to flow under pressure and to plastically deform is not decisive in the design according to the invention of a gear wheel because potentially damaging forces are received by the bearing rings that are supporting one another and hence an unwanted deformation of the core element arranged between the bearing rings in the axial directions is practically excluded. As a result, a greater design freedom than in the prior art is facilitated in view of the combination of different materials for the bearing rings and the core element.

The bearing rings can be connected fixedly, preferably non-detachably, to the core element, for example by substance-to-substance bonding such as welding or adhesive bonding, or by embedding or insert moulding. As a result, the gear wheel can be provided as an integral, easy-to-assemble component.

The bearing rings are preferably attached to both axial end sides of the core element, wherein the bearing faces, as seen from the core element, are directed actually to the outside, for example as substantially circular-ring-shaped or conical bearing faces. In one bearing arrangement, the bearing faces are in sliding contact, or by way of rolling bodies in rolling-body contact, with corresponding outer bearing faces that are arranged axially on both sides of the gear wheel. Here, it is possible to realize angular-contact bearings by conical bearing faces, which may also be provided with rolling body raceways that are at an angle to the axis, said angular-contact bearings simultaneously facilitating an optimized radial and axial bearing and support.

Initially, the bearing rings can be provided as two separate components, which are assembled in the gear wheel with the core element such that they are connected to one another directly or indirectly in the axial direction for axial force transmission purposes. The force transmission can be effected in direct contact, or by way of force transmission elements disposed therebetween, although these do not introduce any force into the core element in the axial direction.

Provision can be made for the two bearing rings to be embodied together in integral fashion. Here, both bearing rings are embodied at a one-piece integral bearing ring element. By way of example, such a bearing ring element can have a sleeve-shaped or drum-shaped embodiment, with the bearing faces being situated in the region of the axial end sides. In the axial direction, the bearing faces are continuously connected to one another in integral fashion by way of the bearing ring element. The power flow in the case of an axial load is consequently effected through the continuous material of the bearing ring element. It is likewise conceivable and possible to initially manufacture separate bearing rings and to connect these to one another to form a bearing ring element in a further step, before the connection to the core element is effected.

The gear wheel can be mounted in rolling-element bearings, wherein the bearing faces of the bearing rings have rolling body raceways, preferably ball-bearing raceways. The axially opposing outer bearing faces that are assigned to the bearing rings likewise have corresponding ball-bearing raceways, and ball bearings as rolling bodies are arranged so as to roll between the ball-bearing raceways. In this embodiment, the bearing rings form inner rings of rolling-element bearings, preferably with bearing faces or ball-bearing raceways lying at an angle to the axis such that angular-contact ball bearings are formed, which facilitate the reception of bearing loads in the axial and radial direction in the case of a compact design. Preferably, the bearing faces are embodied in such a way that the gear wheel is mounted in the housing by means of an X-bearing.

The bearing rings and the outer bearing faces can also have sliding faces that slide on one another such that a plain bearing arrangement is formed.

It is possible that the bearing rings are embodied as sheet metal shaped parts, preferably from sheet steel. Such sheet metal shaped parts can be manufactured efficiently as press/punch parts with the demanded properties. Individual bearing rings can be made available as bushings, which each have a bearing face and which, according to the invention, are connected to one another and to the core element. Both bearing rings also can be arranged on a single bearing ring element, which can be produced by connecting two bearing rings or which can be manufactured as an integral sheet metal shaped part from a single sheet metal portion. The sheet metal shaped part can have integrally formed raceways for rolling bodies, preferably ball-bearing raceways, that can be embodied to be sufficiently hard, for example also by means of continuous or partial hardening or hard coating. The raceways are connected by integral continuous sheet metal portions.

Alternatively, it is likewise conceivable and possible for the bearing rings to be embodied as a cold extrusion part or as a selective laser melting component.

An advantageous embodiment provides for the toothing portion and/or the spindle nut and/or a connecting piece to have an integral one-piece embodiment with the core element. The core element can be manufactured from materials which, on account of their material properties, are well suited to the use as gear elements. By way of example, plastics are well suited for providing smooth running and low-wear toothings and screw drives. According to the invention, the toothing can be molded into the core element consisting of plastics for the drive engagement with the drive unit and—in the case of a plunger spindle drive with a spindle nut that is driveable to rotate—the female thread of the spindle nut can be molded into the core element consisting of plastics. In the case of a rotation spindle drive, the core element likewise can comprise a toothing that is integrally molded into plastics, and a connecting piece for connecting the gear wheel to the threaded spindle for rotation therewith.

It is advantageous for the core element to be embodied as a plastics injection molded part. Manufacturing by way of the injection molding method from thermoplastic plastics, for example polypropylene (PP), polyoxymethylene (POM) or the like, is efficient and facilitates flexible shaping, also in view of the embodiment of the toothing or the female thread. Optionally, the plastics can be provided with a reinforcement, for example by the addition of reinforcement fibers, in order to increase the strength, Manufacturing the core element as a plastics injection molded part facilitates a particularly advantageous connection to the bearing rings by virtue of the core element being molded onto the bearing rings. Here, the bearing rings are arranged in the cavity of an injection molding tool and at least partly surrounded by the molten liquid plastics injected therein such that, after cooling, they are substance-to-substance bonded to the plastics of the core element. A particularly secure connection can be reached by virtue of the bearing rings having interlock elements that are substance-to-substance bonded and connected in an interlocking fashion to the core element. By way of example, the interlock elements can have perforations and/or projections and/or a knurling of the bearing ring or rings, which are penetrated by the plastics material, and embedded in the latter, when injection molding the core element. After cooling, this results in the bearing rings, or a bearing ring element comprising both bearing rings, being anchored in a non-detachably secured manner by an interlocking connection and substance-to-substance bond in the core element by way of the interlock elements. As a result, the toothing, the female thread and/or a connecting piece can be connected to the bearing rings securely and positionally accurately in the long-term. Even in the case of a core element that is not manufactured as an injection molded part, the interlock elements can serve to produce an interlocking connection between the core element and one or both bearing rings.

In an adjustment drive according to the invention, the bearing rings can be braced between corresponding outer bearing rings of a bearing arrangement. Between the outer bearing rings, the gear wheel is rotatably mounted by way of the bearing faces of the bearing rings. In order to set and minimize the bearing play, the outer bearing rings can be moved against one another, and hence against the respectively corresponding bearing rings, in the axial direction and can be pressed on with a preloading force. The preloading force can be produced by elastic preloading elements, which are supported at a secure counter bearing, for example a bearing housing in the axial direction. Depending on the embodiment of the steering column, the counter bearing can be securely attached to the actuating unit, the carrying unit or a casing unit connected to the carrying unit in the axis direction. Such a preloading element can comprise a spring element, for example a disk spring or wave spring, or else an elastomeric element in the form of a rubber ring or the like.

In the various figures, the same parts are always provided with the same designations, and are therefore in each case also generally only referred to or mentioned once.

Figure 2:
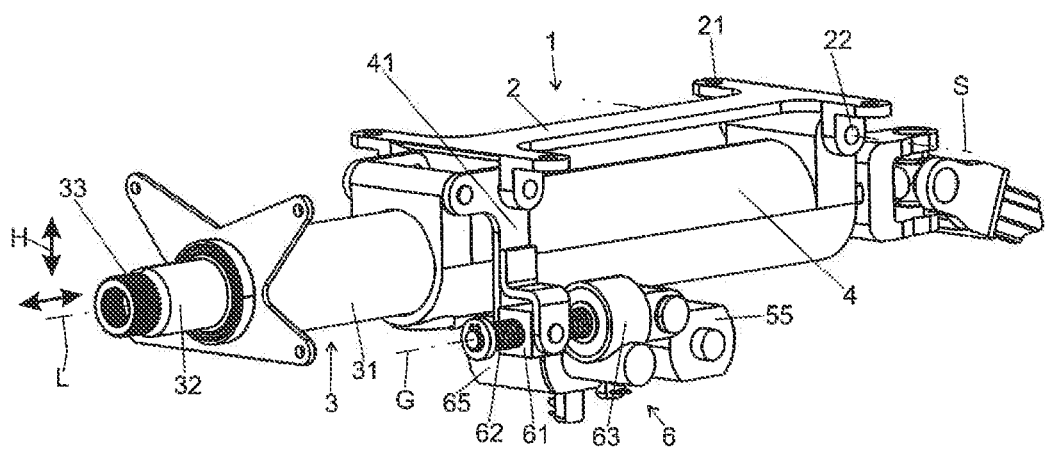
FIG. 2 is a further perspective view of the steering column per FIG. 1, from a different viewing angle.

FIG. 1 shows, from obliquely top right, a steering column 1 according to the invention in a schematic perspective view of the rear end in relation to the direction of travel of a vehicle (not illustrated here), where a steering wheel (not illustrated here) is held in the operating region. FIG. 2 shows the steering column 1 in a view from the opposite side, i.e., as seen from top right.

The steering column 1 comprises a carrying unit 2, which is embodied as a console that comprises fastening means 21 in the form of fastening bores for attachment to a vehicle body (not illustrated). The carrying unit 2 holds an actuating unit 3, which is received in a casing unit 4—which is also referred to as a guide box or box-section swinging fork.

The actuating unit 3 has a steering column tube 31, in which a steering spindle 32 is mounted to be rotatable about a longitudinal axis L, said steering spindle extending axially in the longitudinal direction, i.e., in the direction of the longitudinal axis L. Formed at the rear end of the steering spindle 32 is a fastening portion 33, a steering wheel (not illustrated) being attachable thereon.

In order to realize a longitudinal adjustment, the actuating unit 3 is received in the casing unit 4 so as to be telescopically displaceable in the direction of the longitudinal axis L in order to be able to position the steering wheel that is connected to the steering spindle 32 forward and backward in the longitudinal direction relative to the carrying unit 2, as indicated by the double-headed arrow parallel to the longitudinal axis L.

The casing unit 4 is mounted in a pivot bearing 22 at the carrying unit 2 in a manner to be pivotable about a horizontal pivot axis S that is transverse to the longitudinal axis L. In the rear region, the casing unit 4 is connected to the carrying unit 2 via an actuating lever 41. As a result of a rotational movement of the actuating lever 41 by means of an illustrated actuating drive 6 (see FIG. 2), the casing unit 4 can be pivoted relative to the carrying unit 2 about the pivot axis S that lies horizontally in the installed state, as a result of which it is possible to adjust a steering wheel, attached to the fastening portion 33, in the height direction H, as indicated by the double-headed arrow.

A first adjustment drive 5 for adjusting the longitudinal position of the actuating unit 3 relative to the casing unit 4 in the direction of the longitudinal axis L comprises a spindle drive with a spindle nut 51 with a female thread 74 extending along an axis G, a threaded spindle 52 engaging therein; i.e., the male thread of said threaded spindle is screwed into the corresponding female thread 74 of the spindle nut 51. The threaded spindle axis of the threaded spindle 52 is identical to the axis G and extends substantially parallel to the longitudinal axis L.

The spindle nut 51 is mounted in a bearing housing 53 so as to be rotatable about the axis G, said bearing housing being securely connected to the casing unit 4. In the direction of the axis G, the spindle nut 51 is axially supported at the casing unit 4 via the bearing housing 53, as will still be explained in more detail below.

With a fastening element 54 embodied at the rear end thereof, the threaded spindle 52 is connected to the actuating unit 3 via a transmission element 34, to be precise in a manner fixed in the direction of the axis G or the longitudinal axis L and stationary in respect of a rotation about the axis G. As a result of the spindle nut 51 that is driveable to rotate and the threaded spindle 52 that is stationary in respect of rotation, a so-called plunger spindle drive is realized.

The transmission element 34 extends from the actuating unit 3 through a slot-shaped passage opening 42 in the casing unit 4. In order to adjust the steering column 1 in the longitudinal direction, the transmission element 34 can be moved freely along in the passage opening 42 in the longitudinal direction.

The adjustment drive 5 has an electric servomotor 55, by means of which the spindle nut 51 is driveable to rotate in respect of the axis G relative to the stationary threaded spindle 52. As a result, it is possible—depending on the direction of rotation of the servomotor 55—to displace the threaded spindle 52 in the direction of the axis G in translational fashion relative to the spindle nut 51 such that, accordingly, the actuating device 3 connected to the threaded spindle 52 is adjusted in the direction of the longitudinal axis L relative to the casing unit 4 connected to the spindle nut 51. The drive of the spindle nut 51 and the support of the spindle nut 51 in the direction of the axis G at the casing unit 4 will still be explained in detail further down.

In FIG. 2, which shows a perspective view of the steering column 1 from the side lying at the back in FIG. 1, it is possible to recognize how a second adjustment drive 6 for adjusting the height direction H is attached to the steering column 1. This adjustment drive 6 comprises a spindle nut 61, in the female thread 74 of which a threaded spindle 62 engages along an axis G. The threaded spindle 62 is mounted so as to be rotatable about the axis G in a bearing housing 63, which is fastened at the casing unit 4, axially supported, in the direction of the axis G, at the casing unit 4 and driveable, optionally in both directions of rotation, by an electric servomotor 65 so as to be rotatable about the axis G. This will still be explained in detail further down.

The spindle nut 61 is attached in a stationary manner in respect of a rotation about the axis G at one end of the two-arm actuating lever 41, which is mounted at the carrying unit 22 so as to be rotatable about a pivot bearing 23, the other arm of said actuating lever being connected, with the other end, to the casing unit 4.

By rotating the threaded spindle 61, it is possible—depending on the direction of rotation of the servomotor 65—to displace the spindle nut 61 in translational fashion relative to the threaded spindle 62 in the direction of the axis G such that, accordingly, the casing unit 4, which is connected to the spindle nut 41 via the actuating lever 41, together with the adjusting device 3 received therein can be adjusted up or down in the height direction H relative to the carrying unit 2, as indicated by the double-headed arrow. The drive of the threaded spindle 62 and the support of the threaded spindle 62 in the direction of the axis G at the casing unit 4 will still be explained in detail below.

Figure 3:
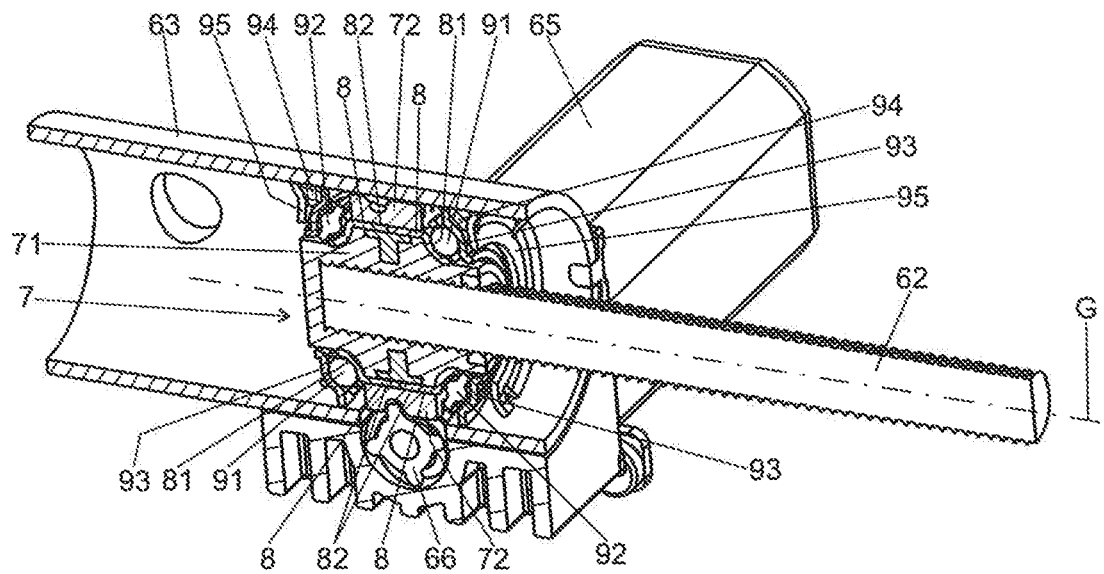
FIG. 3 is a perspective view of a longitudinal section along the threaded spindle axis through a spindle drive of an adjustment device of a steering column as per FIGS. 1 and 2.
Figure 4:
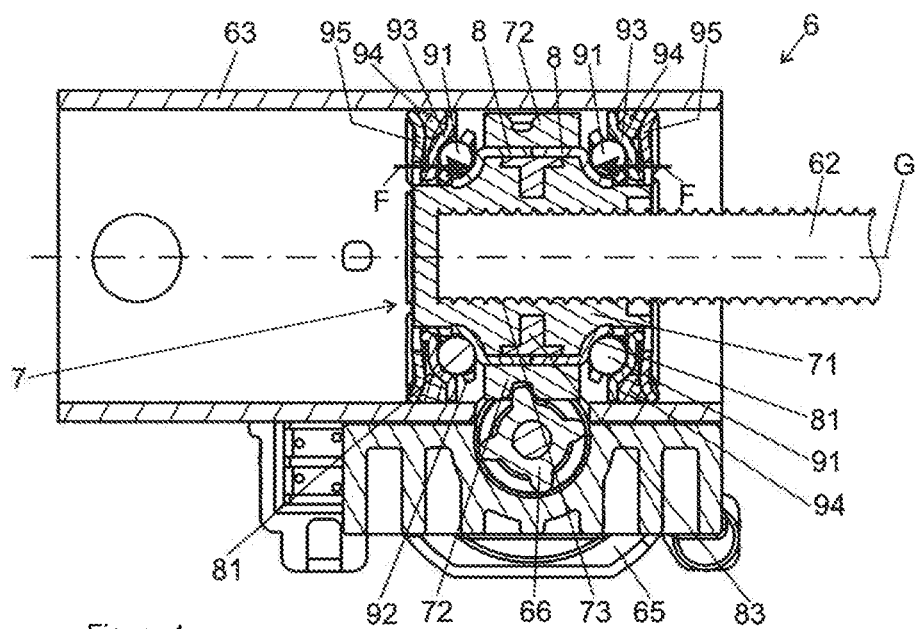
FIG. 4 is a side view of a longitudinal section as in FIG. 3.

FIG. 3 and FIG. 4 present a longitudinal section through the bearing housing 63 of the adjustment drive 6 along the axis G in different views.

A gear wheel 7 designed according to the invention is fastened to the threaded spindle 62 for rotation therewith in respect of the axis G. The gear wheel 7 has a core element 71 made out of plastics, which is preferably produced from a thermoplastic such as PP, POM or the like as a plastics injection molded part. At its outer circumference, the core element 7 comprises a circumferential toothing 72 that is coaxial to the axis G, said toothing being embodied as a worm toothing in the illustrated example such that the gear wheel 7 forms a worm wheel. A worm 66 that is driveable to rotate by the servomotor 65 engages in the toothing 72.

In the region of a central connecting portion 73, which forms a connecting piece, the core element 71 is connected to the threaded spindle 62 for rotation therewith. By way of example, the connection can be embodied as a substance-to-substance bond by virtue of the core element 71 being molded onto the threaded spindle 62 in the process of injection molding to the threaded spindle 62. In addition or as an alternative thereto, an interlocking and/or any other type of fastening may be provided.

Bearing rings 8 are fixedly connected to the core element 71. Each bearing ring 8 has a ring-shaped bearing face 81 that is coaxial to the axis G and embodied as the ball-bearing raceway. As seen from the core element 71, the two bearing faces 81 run together to the outside, in an end-side conical manner. Expressed differently, the ball-bearing raceways are at an angle to the axis G.

Axially, the bearing rings 8 comprise support portions 82 that are directed against one another in the direction of the axis G, said support portions directly lying against one another in the shown example such that the bearing rings 8 are directly supported against one another in the direction of the axis G. In particular, no plastics material of the core element 71 is situated between the support portions 82 of the bearing rings 8 that are in contact with one another.

The bearing rings 8 are preferably embodied as sheet metal shaped parts, particularly preferably as press/punch parts made of sheet steel. For the purposes of connection to the gear wheel 7, the plastics of the core element 71 is injection molded onto the bearing rings 8 and the latter is thus embedded into the core element 71 in a substance-to-substance bonded and interlocking manner, apart from the bearing faces 81 that are exposed to the outside on the end side. Optionally, provision can be made of a fixing element 83, at which the two bearing rings 8 are positioned relative to one another and held during the insert molding with plastics such that they lie against one another axially in the direction of the axis G. However, the fixing element 83 can also be omitted. Alternatively, it is also conceivable to directly connect the bearing rings 8 prior to insert molding, for example by point welding or the like.

The bearing faces 81 form the inner rings of a rolling-element bearing arrangement 9, which comprises ball bearings 91 that are held in a rotatable manner in a ball-bearing cage 92 and that are arranged so as to roll in the axial bearing gap between said ball-bearing raceways of the bearing faces 81 and corresponding ball-bearing raceways in outer bearing rings 93. As seen from the gear wheel 7, the outer bearing rings 93 are supported axially to the outside on both end sides by way of elastic spring elements 94, elastomeric or rubber rings in the shown example, against axial counter bearings in the form of securing rings 95, which in turn are connected in a manner stationary in the axial direction of the axis G to the bearing housing 93, for example by wedging, caulking or jamming. The spring element 94 likewise can be embodied as a wave spring or disk spring.

An axial preloading force F is applied during the assembly of the rolling-element bearing arrangement 9 for the purposes of avoiding bearing play in the direction of the axis G. It is applied by the securing rings 95, the spring elements 94 and the ball bearings 91 on the bearing faces 81 of the bearing rings 8 on the bearing rings 8, as indicated by force arrows in FIG. 4. The preloading force F is maintained during the entire service life by the elastic spring elements 94. As a result, the two bearing rings 8 are pressed against one another axially, wherein the force F acting on the bearing faces 81 during operation is transmitted completely in the power flow through the bearing rings 8. What is advantageous here, in particular, is that the plastics material of the core element 71 is not situated in the power flow between the bearing rings 8, i.e., it is not subjected to pressure. This unloading ensures that the plastics material is not plastically deformed by flowing.

Figures 5, 6:
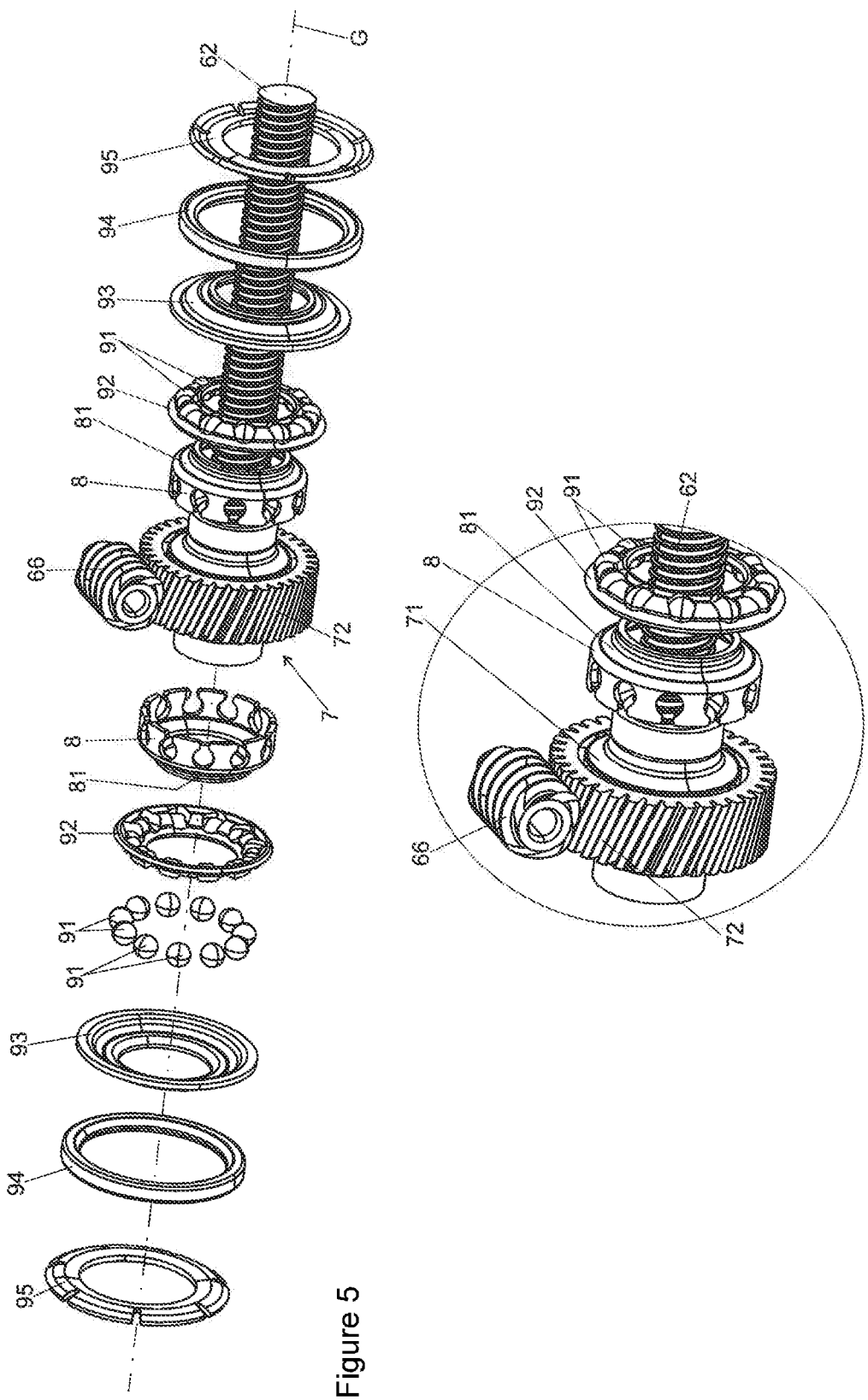
FIG. 5 is an exploded view of the spindle drive as per FIGS. 3 and 4.
FIG. 6 is a detailed view of the spindle drive as per FIG. 5.

FIG. 5 shows the individual parts of the gear wheel 7 and of the rolling-element bearing arrangement 9 pulled apart in an exploded illustration in the direction of the axis G, FIG. 6 shows a magnified detailed view therefrom.

Figure 7:
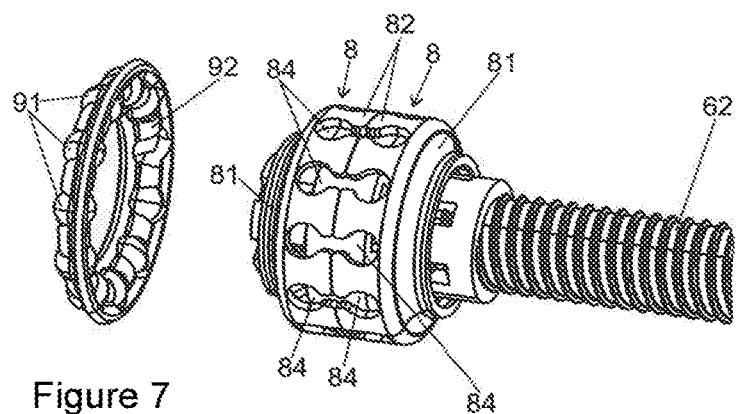
FIG. 7 is a further detailed view of the spindle drive as per FIG. 5.
Figure 8:
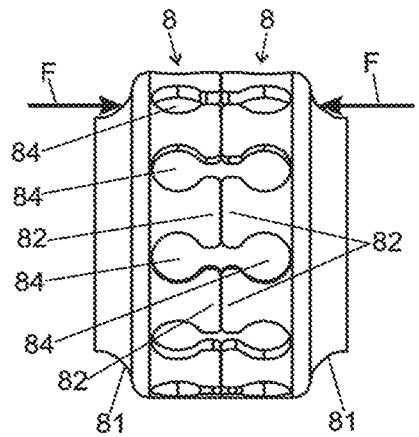
FIG. 8 is a lateral view of bearing rings in a first embodiment.

FIG. 7 and FIG. 8 show the bearing rings 8 in the position in which they are injection molded into the plastic, wherein the core element 71 has been omitted for a better overview. The drum-shaped or tube-sleeve-shaped arrangement formed by the two bearing rings 8 lying axially against one another in the region of the support portions 82, which facilitates the power flow of the force F according to the invention between the opposing bearing faces 81, without the plastics material of the core element 71 being involved in the process, clearly emerges herefrom.

For the purposes of anchoring in the plastics of the core element 71, the bearing rings 8 can comprise interlock elements in the form of perforations 84, which are continuously open through the sheet metal between the support portions 82 in the example shown in FIG. 8, and which are also open in the axial direction. During the injection molding for manufacturing the core element 71, the plastics melt flows around the perforations 84 and the latter is consequently embedded in the core element 71 by substance-to-substance bonding and in an interlocking manner.

Figure 9:
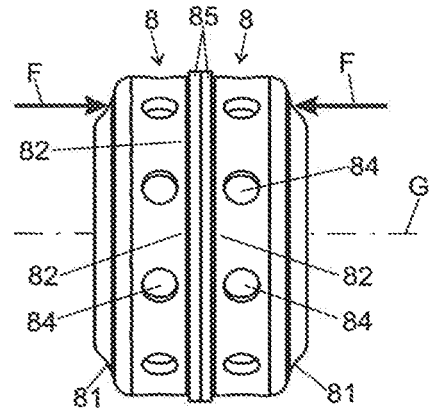
FIG. 9 is a lateral view of bearing rings, like in FIG. 8, in a second embodiment.

FIG. 9 shows an alternative embodiment in the same view as in FIG. 8. Here, the perforations 84 are embodied as openings that are enclosed around the edge. An outwardly protruding, bead-shaped projection 85 is provided as an additional interlock element in the region of the support portion 82, in which the bearing rings 8 lie against one another in the direction of the axis G. As a result, the bearing rings 8 likewise are securely positioned and held relative to one another.

Figure 10:
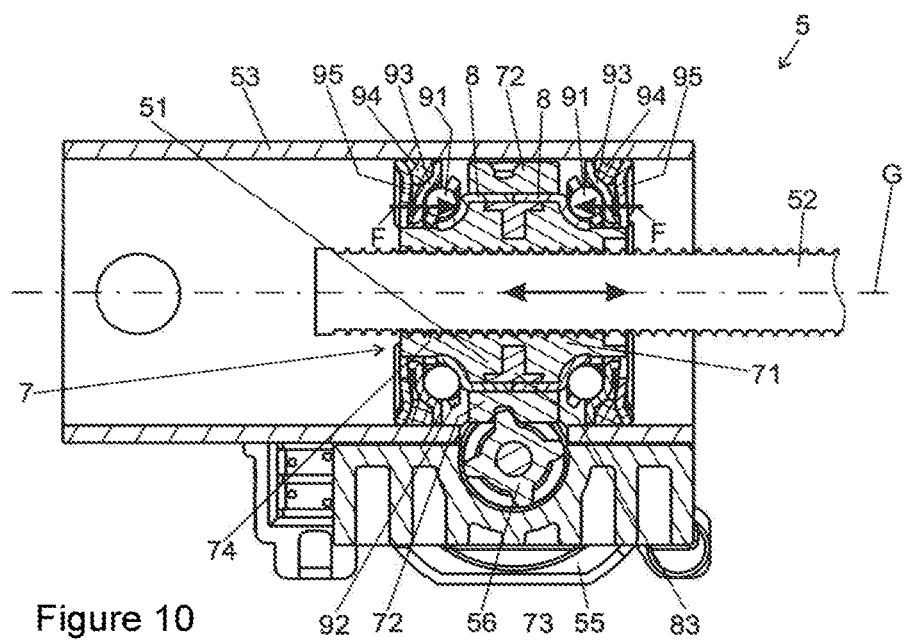
FIG. 10 is a longitudinal sectional view along the threaded spindle axis through a spindle drive of an adjustment device of a steering column as per FIGS. 1 and 2 in a second embodiment.

In the same view as in FIG. 4, FIG. 10 shows a longitudinal section through the plunger spindle arrangement of the adjustment drive 5 from FIG. 1, which comprises a threaded spindle 52 that is driveable to rotate by the drive motor 55. This adjustment drive 5 likewise has a gear wheel 7, the spindle nut 51 having an integral embodiment in the core element 71 thereof. To this end, a female thread 74 is moulded into the core element 71 in an injection molding method. This is particularly advantageous in that the plastics-metal contact between the female thread 74 of the spindle nut 51 and the threaded spindle 52 consisting of steel results in the spindle drive being particularly smooth running, low-play and low-wear. Otherwise, the individual functional constituent parts of the gear wheel 7 are embodied like in the example of the rotational spindle drive described in relation to FIG. 4. The advantages in view of the attachment of the core element 71 that is substantially force-free in the direction of the axis G are identical.

What is claimed is:

1. A steering column that is adjustable by motor for a motor vehicle, comprising:
   a carrying unit configured to attach to a vehicle body, and
   an actuating unit held by the carrying unit, in which a steering spindle is rotatably mounted about a longitudinal axis, the actuating unit including:
   an adjustment drive, which is connected to the carrying unit and to the actuating unit, and by means of which the actuating unit is adjustable relative to the carrying unit, wherein the adjustment drive includes a threaded spindle with an axis, said threaded spindle engaging in a spindle nut, a drive unit and a gear wheel that is driveable to rotate about the axis by the drive unit, said gear wheel including a toothing portion that is arranged axially between two circumferential bearing faces coaxial to the axis, wherein the gear wheel is connected to the spindle nut or the threaded spindle for rotation therewith, and wherein the threaded spindle and the spindle nut are driveable to rotate relative to one another about the axis by the drive unit, wherein the gear wheel has a core element, to which two bearing rings are connected, said bearing rings each having a bearing face and being axially supported against one another.

2. An adjustment drive for a steering column that is adjustable by motor for a motor vehicle, said adjustment drive comprising:

a threaded spindle with an axis, said threaded spindle engaging in a spindle nut, a drive unit and a gear wheel which is driveable to rotate about the axis by the drive unit and which has a toothing portion, which is arranged axially between two circumferential bearing faces that are coaxial to the axis, wherein the gear wheel is connected to the spindle nut or the threaded spindle for rotation therewith, and wherein the gear wheel has a core element, to which two bearing rings are connected, said bearing rings each having a bearing face and being axially supported against one another.

3. The adjustment drive of claim 2, wherein the bearing rings are integrally formed together.

4. The adjustment drive of claim 2, wherein the bearing faces of the bearing rings have rolling body raceways.

5. The adjustment drive of claim 4, wherein the bearing faces of the bearing rings have ball-bearing raceways.

6. The adjustment drive of claim 2, wherein the bearing rings are sheet metal shaped parts.

7. The adjustment drive of claim 2, wherein one or more of the toothing portion, the spindle nut, and a connecting piece is formed integral with the core element.

8. The adjustment drive of claim 2, wherein the core element is a plastics injection molded part.

9. The adjustment drive of claim 8, wherein the core element is injection molded onto the bearing rings.

10. The adjustment drive of claim 2, wherein the bearing rings comprise interlock elements that are connected to the core element.

11. The adjustment drive of claim 2, wherein the bearing rings are braced between corresponding outer bearing rings of a bearing arrangement.

\* \* \* \* \*